United States Patent
Meyer et al.

(10) Patent No.: US 9,442,968 B2
(45) Date of Patent: Sep. 13, 2016

(54) EVALUATION OF VARIANT CONFIGURATION USING IN-MEMORY TECHNOLOGY

(71) Applicant: SAP SE, Walldorf (DE)

(72) Inventors: Petra Meyer, Walldorf (DE); Sven Liesecke, Mannheim (DE); Nadine Gaertner, Speyer (DE)

(73) Assignee: SAP SE, Walldorf (DE)

(*) Notice: Subject to any disclaimer, the term of this patent is extended or adjusted under 35 U.S.C. 154(b) by 95 days.

(21) Appl. No.: 14/230,912

(22) Filed: Mar. 31, 2014

(65) Prior Publication Data

US 2015/0278347 A1  Oct. 1, 2015

(51) Int. Cl.
| | | |
|---|---|---|
| *G06F 7/00* | (2006.01) | |
| *G06F 17/30* | (2006.01) | |
| *G06Q 30/06* | (2012.01) | |
| *G06Q 50/04* | (2012.01) | |

(52) U.S. Cl.
CPC ..... *G06F 17/30327* (2013.01); *G06Q 30/0621* (2013.01); *G06Q 50/04* (2013.01); *Y02P 90/30* (2015.11)

(58) Field of Classification Search
CPC ............ G06F 17/30466; G06F 7/30463; G06F 17/30498; G06F 17/30584; G06F 17/30463
USPC .......................................................... 707/646
See application file for complete search history.

(56) References Cited

U.S. PATENT DOCUMENTS

| | | |
|---|---|---|
| 5,812,840 A | 9/1998 | Shwartz |
| 6,223,094 B1 | 4/2001 | Muehleck et al. |
| 6,519,580 B1 | 2/2003 | Johnson et al. |
| 6,665,664 B2 | 12/2003 | Paulley et al. |
| 6,983,187 B2 | 1/2006 | Kern |
| 7,225,038 B2 | 5/2007 | Kind |
| 7,665,030 B2 | 2/2010 | Sauermann et al. |
| 7,730,053 B2 | 6/2010 | Sauermann |

(Continued)

OTHER PUBLICATIONS

"In-memory database." Wikipedia, the free encyclopedia. Jun. 10, 2015. <https://en.wikipedia.org/wiki/in-memory_database>.

(Continued)

*Primary Examiner* — Hosain Alam
*Assistant Examiner* — Nicholas Allen
(74) *Attorney, Agent, or Firm* — Jones Day

(57) ABSTRACT

A system, method, and computer program product for evaluating variant configuration using in-memory technology. Embodiments receive configuration data and a selection condition to be solved, bring Boolean selection condition expressions into disjunctive normal form (DNF) in memory, join concrete configuration values with the selection condition, and compare values. Embodiments aggregate the comparison results per AND-group with a minimum function, and aggregate those results per OR-group with a maximum function and output results of the selection condition for a concrete configuration. Embodiments may employ SQL Script statements. Embodiments may use conjunctive normal form (CNF) instead of DNF with corresponding aggregation ordering. Embodiments may extend the pure normal forms to enable calculations, string operations, evaluation of non-fixed-value literals, multi-valued literals, in-lists, and variant tables by translating and integrating them into the pattern of conjunctive and disjunctive aggregations. Parallelization and complexity-ordered branch evaluations are also provided.

17 Claims, 15 Drawing Sheets

(56) References Cited

U.S. PATENT DOCUMENTS

| | | | |
|---|---|---|---|
| 8,484,208 B1* | 7/2013 | Raghavan | G06F 17/30941 707/728 |
| 8,498,889 B1 | 7/2013 | Marsten | |
| 8,510,261 B1 | 8/2013 | Samantray | |
| 8,533,142 B2 | 9/2013 | Collier et al. | |
| 2002/0165701 A1 | 11/2002 | Lichtenberg et al. | |
| 2005/0065926 A1* | 3/2005 | Chen | G06F 17/30454 |
| 2006/0052896 A1 | 3/2006 | Woehler | |
| 2008/0010328 A1 | 1/2008 | Moeller et al. | |
| 2009/0210782 A1* | 8/2009 | Denoual | G06F 17/2247 715/234 |
| 2010/0121868 A1* | 5/2010 | Biannic | G06F 17/3097 707/759 |
| 2010/0121869 A1 | 5/2010 | Biannic | |
| 2011/0213659 A1* | 9/2011 | Fontoura | G06Q 30/02 705/14.52 |
| 2011/0213767 A1* | 9/2011 | Fontoura | G06Q 30/08 707/722 |
| 2011/0225038 A1* | 9/2011 | Fontoura | G06F 17/30501 705/14.49 |
| 2011/0252073 A1* | 10/2011 | Pauly | G06F 17/30297 707/812 |
| 2011/0295906 A1* | 12/2011 | Liu | G06F 17/3051 707/802 |
| 2012/0041979 A1* | 2/2012 | Lee | G06N 5/022 707/776 |
| 2012/0137108 A1* | 5/2012 | Koch, III | G06F 9/30018 712/200 |
| 2013/0013392 A1* | 1/2013 | Kejariwal | G06Q 30/0241 705/14.42 |
| 2013/0018901 A1* | 1/2013 | Bnayahu | G06F 17/30979 707/756 |
| 2013/0054551 A1 | 2/2013 | Lange | |
| 2013/0091170 A1* | 4/2013 | Zhang | G06Q 10/06313 707/783 |
| 2013/0191809 A1* | 7/2013 | Lovitt | G06F 8/75 717/109 |
| 2013/0227638 A1* | 8/2013 | Giambiagi | G06F 21/00 726/1 |
| 2013/0246016 A1* | 9/2013 | Fertig | G06N 5/02 703/2 |
| 2014/0040182 A1* | 2/2014 | Gilder | G06F 17/30578 707/602 |

OTHER PUBLICATIONS

"Column-oriented DBMS." Wikipedia, the free encyclopedia. Jun. 26, 2015. <https://en.wikipedia.org/wiki/Column-oriented_DBMS>.

"Real-time Control System." Wikipedia, the free encyclopedia. Jan. 16, 2014. <https://en.wikipedia.org/wiki/Real-time_control_system>.

European Search Report for EP 15161964, dated Jun. 10, 2015.

The SAP HANA Database—An Architecture Overview, IEEE Data Engineering Bulletin, vol. 35, Mar. 1, 2012, pp. 1-6.

SAP HANA Database—Data Management for Modern Business Applications, Sigmod Record (vol. 40, No. 4), Dec. 1, 2011, pp. 45-51.

European Office Action issued in European Patent Application No. 15 161 964.0, dated Dec. 14, 2015.

\* cited by examiner

FIG. 4A

400 — INPUT

401

| CONFIGURATION ID | CHARACTERISTIC | CONFIGURATION VALUE |
|---|---|---|
| 0815 | COLOR | BLUE |
| 0815 | SIZE | L |

402

| DEPENDENCY ID | CONFIG. ID |
|---|---|
| 4711 | 0815 |

403

| DEPENDENCY ID | DISJUNCTION | IS_NEGATION | CHARACTERISTIC | VALUE |
|---|---|---|---|---|
| 4711 | 1 | | COLOR | BLUE |
| 4711 | 1 | | SIZE | L |
| 4711 | 2 | | COLOR | RED |

FIG. 4B

EVALUATION — 400

404

| DEPENDENCY ID | DISJUNCTION ID | IS_NEGATION | CHARACTERISTIC | VALUE | CONFIG. ID | CONFIG. VALUE | RESULT LITERAL |
|---|---|---|---|---|---|---|---|
| 4711 | 1 | | COLOR | BLUE | 0815 | BLUE | 1 |
| 4711 | 1 | | SIZE | L | 0815 | L | 1 |
| 4711 | 2 | | COLOR | RED | 0815 | BLUE | 0 |

405

| DEPENDENCY ID | DISJUNCTION ID | CONFIG ID | RESULT AND |
|---|---|---|---|
| 4711 | 1 | 0815 | 1 |
| 4711 | 1 | 0815 | 0 |

406

| DEPENDENCY ID | CONFIG. ID | RESULT OR |
|---|---|---|
| 4711 | 0815 | 1 |

FIG. 6A
FIG. 6B
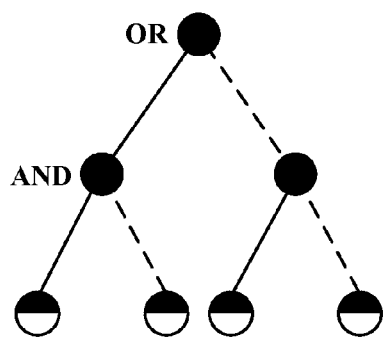
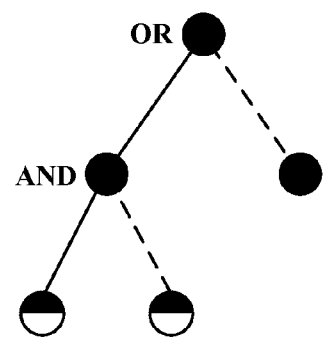
● = AGGREGATION
◐ = SIMPLE BOOLEAN EXPRESSION
WITH 1 OR 2 OPERANDS,
INCLUDING COMPARISONS

● = AGGREGATION

○ = GENERAL EXPRESSION:

- SIMPLE BOOLEAN EXPRESSION OR

- EXPRESSSION INVOLVING MORE THAN 1 CHARACTERISTIC OR

- EXPRESSION INVOLVING OPERATORS OTHER THAN = SUCH AS <, >, NUMERIC OR STRING OPERATION WITH 1 OR 2 OPERANDS: +, -, *, CONCATENATION, ETC.

EVALUATION OF VARIANT CONFIGURATION USING IN-MEMORY TECHNOLOGY

BACKGROUND

The present invention relates to efficient evaluation of queries using in-memory databases, and in particular to optimizing in-memory data management for variant configuration.

Many different products are offered for sale with numerous available features that define particular product variants. Historically, customers may have been offered features that were added to a standard product, or they may have been allowed certain feature omissions or substitutions. One customer may prefer to add air conditioning to a car as an "option" when air conditioning is not a standard product feature for example, while another customer may prefer a convertible car that omits the standard product's hard top. The manufacturer may decide that since few customers are likely to order convertible cars with air conditioning, that product variant may not be offered for sale. A potential customer who wanted such a product variant would therefore be disappointed, and a revenue opportunity may be missed.

The trend toward full customization of a product line has therefore become increasingly popular, along with more flexible manufacturing. The potentially very large number of product features that may specify particular product variants complicates information management for sales, engineering, and production. Variant configuration tools therefore help ensure that a particular product variant having the desired features may be provided. Such tools may prevent problems such as the specification of mutually exclusive product characteristics or product feature combinations that are not offered for sale or are not available for assembly or delivery at a given price or by a given schedule.

One aspect of variant configuration management is the preparation of a bill of materials (BOM), which is a complete, formally structured list of all the lowest-level components needed to produce a particular product line, including all possible provided product variants. BOM preparation or "explosion" is an often difficult and time-consuming process. Rather than simply creating a separate BOM for each of many possible variants, manufacturers may instead use configurable BOMs that describe the required component parts for an entire product line as functions of specified product variant features. These functions can become quite complicated for fully customized products with many user-selectable features. A database may be needed to manage the mapping of the desired features that define the variant configuration and all the components that each variant requires.

In one database model of a configurable BOM, a product feature or characteristic may be used to distinguish one component part from another. A characteristic may include a component name and a component quantity. For example, a component name of "color" with a component quantity of "red" could distinguish one laptop computer case from another. Each component may have many characteristics, such as "left", "rear", "LED", and country of origin "Japan" for a particular car tail light. Each characteristic of each component may be used as part of a selection condition to identify the required components of a product variant. Although described above in terms of product assembly from component parts, configuration management issues may also arise in many other situations, and may involve different types of components, such as pieces of equipment, routings, documents, etc. Further, although selection conditions are familiar to consumers when choosing products, in this description selection conditions are used as exemplary cases of a more general object dependency.

Evaluation of the possibly very complex object dependencies during manufacturing resource planning (MRP) and other processes is very time critical. The fastest available databases thus may be required. In-memory databases that primarily operate on data stored in a computer system's main memory tend to be faster than older databases that required significant external secondary storage input/output operations. In-memory databases may also perform data operations other than calculations (i.e., comparisons, transfers, etc.) much faster than they perform calculations. An example of an in-memory database is SAP's High Performance Analytics Appliance (HANA™) database.

The execution speed of in-memory database operations may however be strongly dependent on the arrangement of data. Unfortunately, the evaluation of object dependencies is not currently optimized for column store databases. Time-consuming processes like BOM explosion management may currently only be optimized for conventional row store databases in scenarios without variant configuration. This limitation severely restricts the utility of such in-memory tools.

Accordingly, the inventors have developed an improved approach to evaluation of variant configuration using in-memory technology.

BRIEF DESCRIPTION OF THE DRAWINGS

FIGS. 4A-4B are diagrams of DNF selection condition evaluation detail, according to an exemplary embodiment.

FIGS. 6A-6B are diagrams of a pure DNF tree in a standard format and a condensed format, according to an exemplary embodiment.

DETAILED DESCRIPTION

As described more fully below, the embodiments disclosed permit improved evaluation of variant configuration using in-memory technology. Configuration data and a selection condition to be solved are inputs to the embodiments. A processor may bring Boolean selection condition expressions into disjunctive normal form (DNF) in memory. DNF expressions comprise a set of OR operations applied to a set of AND operations applied to logically negatable literals. The processor may then join concrete configuration values with the DNF selection condition, and compare values. Embodiments may aggregate the comparison results per AND-group with a minimum function, and may then aggregate those results per OR-group with a maximum function. The processor may then output results of the selection condition for a concrete configuration. The embodiments may utilize SQL Script statements.

Other embodiments may use conjunctive normal form (CNF) instead of disjunctive normal form. CNF expressions comprise a set of AND operations applied to a set of OR operations applied to logically negatable literals. DNF may be used as the default form as it fits customer data better in most cases. DNF typically lists available options in more human-intuitive form. However, one embodiment may cast data into both forms to see which is optimal, i.e., has the fewest number of expressions, so more complex literals may be combined into smaller ones. The literals may comprise fixed values that may be determined directly by comparisons, or in other embodiments the literals may be more general. In some embodiments, determining the actual literal values may be a pre-processing step.

Figure 1:
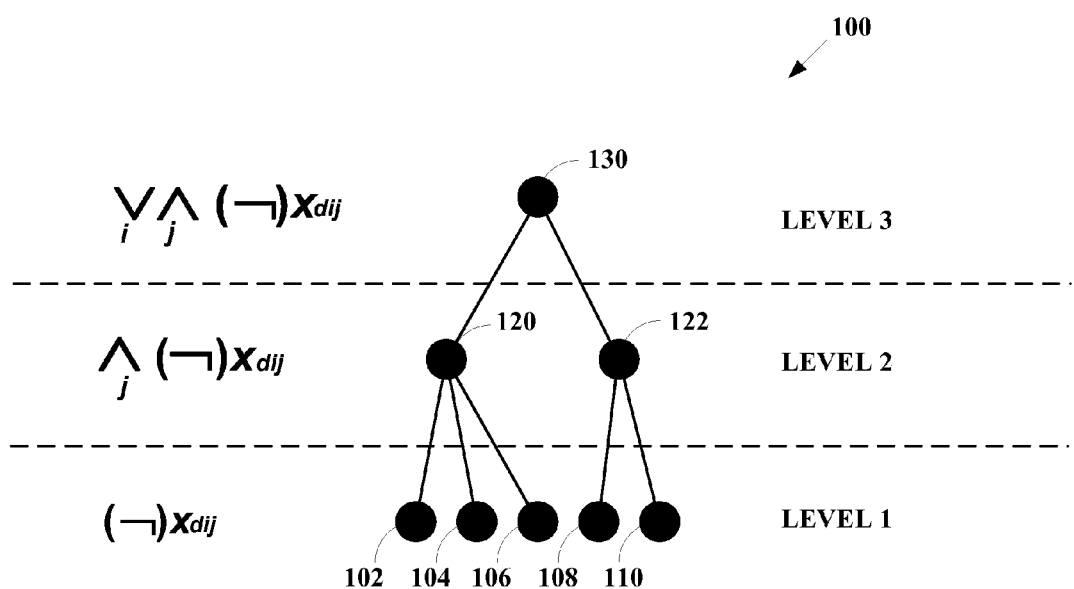
FIG. 1 is a diagram of a Boolean expression tree representing an object dependency in disjunctive normal form (DNF), according to an exemplary embodiment.

Referring now to FIG. 1, a diagram is shown of a Boolean expression tree 100 representing a selection condition in DNF, according to an embodiment. Selection conditions, which typically need to be evaluated quickly, may be modeled as or transformed into Boolean expressions. This will generally have been done already during maintenance of a selection condition or an object dependency. Class positions, which may be used instead of selection conditions, may also be transformed into Boolean expressions. Evaluation may be viewed conceptually as joining an in-memory database with the desired configuration.

Each such object dependency Boolean expression may be visualized as a tree 100 with three levels. The first level, referred to as Level 1 in FIG. 1, comprises a number of literals $X_{dij}$ that are of the format $C_{dij} = V_{dij}$, where $C_{dij}$ is a characteristic and $V_{dij}$ is a characteristic value. Each literal of an object dependency expression, represented as exemplary items 102-110, represents the smallest concept of entry, and may be logically negatable. (In this description, true values are represented by a one and false values are represented by a zero, per convention.)

The second level of the tree comprises a set of j AND (" ∧ ") terms, shown as items 120 and 122, resulting from the evaluation of each corresponding group of literals in a DNF selection condition. That is, each AND term (such as item 120) is true if all of its child literals (such as items 102, 104, and 106) are fulfilled.

The third level of the tree comprises a set of i OR (" ∨ ") terms, shown as item 130, resulting from the evaluation of each corresponding group of AND terms in a DNF selection condition. That is, each OR term (such as item 130) is true if any of its AND terms (such as items 120 and 122) are fulfilled.

One benefit of the disjunctive normal form is that expressions may be evaluated easily by SQL. Each AND term result may be viewed as the minimum of the result of its related child nodes, and each OR term result may be viewed as the maximum of the result of its related child nodes. A set of Boolean expressions may thus be evaluated simultaneously and directly by an in-memory database with a few native selections. An example of an in-memory database is SAP's High Performance Analytics Appliance (HANA™) database, which may employ both row-based and column-based data storage. Embodiments of the present invention may therefore optimize the evaluation of object dependencies for column-based data storage, which is often much faster than row-based data storage for certain problems.

Figure 2:
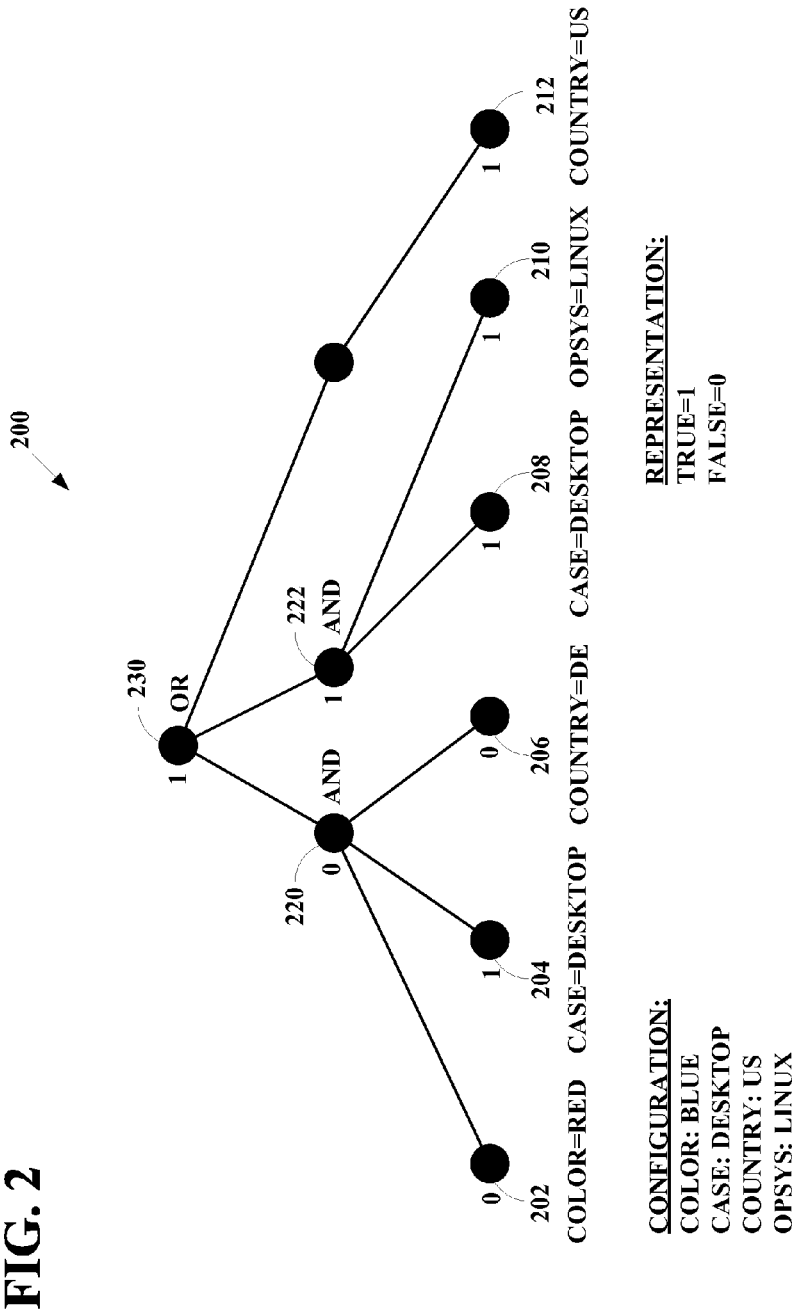
FIG. 2 is a diagram of a Boolean expression tree evaluation, according to an exemplary embodiment.

Referring now to FIG. 2, a diagram is shown of a Boolean expression tree 200 evaluation, according to an embodiment. In this example, a set of literals 202-212 describe characteristics of a computer, such as its color, type of case, country, and operating system. The selection condition is provided as a Boolean expression in DNF, with three literals (202, 204, and 206) for one AND term (220), and two literals for a second AND term (222). One literal (212) is alone, denoting that AND aggregations may be optional.

While literals 204, 208, 210, and 212 are true, the others (202 and 206) are not. The AND term 220 is false because at least one of its related child nodes (202, 204, and 206) is false. The AND term 222 is true because all of its related child nodes (208 and 210) are true. As a result, the OR term 230 is true because at least one of its related child nodes (212, 220, and 222) is true.

Figure 3:
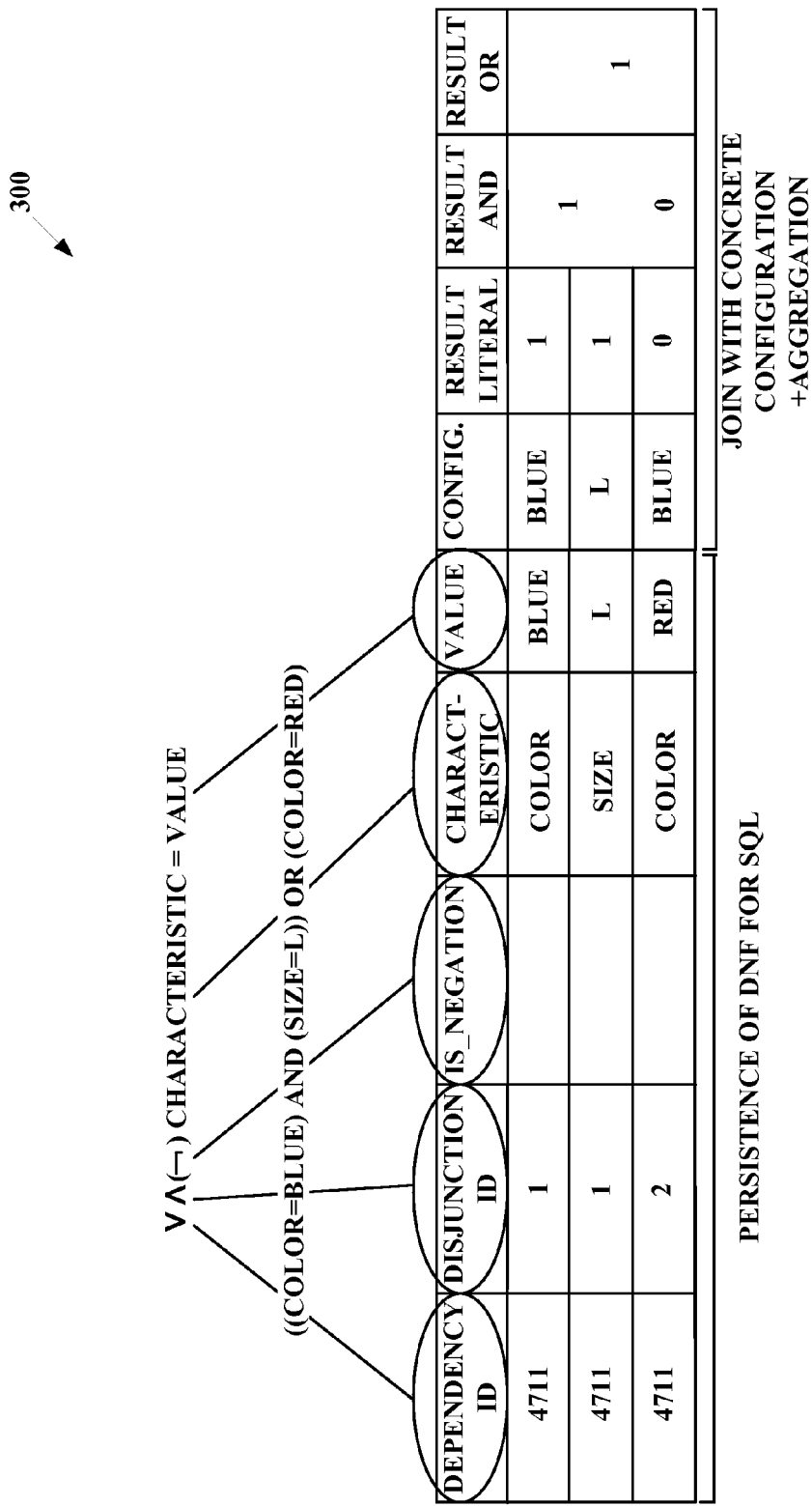
FIG. 3 is a diagram of a DNF selection condition joined with a concrete configuration and aggregation, according to an exemplary embodiment.

Referring now to FIG. 3, a diagram 300 is shown of a DNF selection condition joined with a concrete configuration and aggregation, according to an embodiment. In this case, the selection condition is ((COLOR=BLUE) AND (SIZE=L)) OR (COLOR=RED). One embodiment uses the disjunctive normal form instead of the conjunctive normal form because the business application program's compilation of the selection condition syntax is already stored in DNF. Thus, the embodiment may efficiently derive the DNF for the SQL interpretation from the business application program's existing compilation.

FIG. 3 depicts the conceptual structure of the table that stores the DNF selection condition for SQL, and how the embodiment may join it with a concrete configuration to obtain a result. The persistence is shown in a table named "dependencies". The disjunction ID is introduced to group the literals (two, in this case) that are connected by AND. The concrete configuration desired is that COLOR=BLUE and SIZE=L. The result literal from the join is therefore true for characteristic values that match the configuration, and false for those characteristic values that do not match the configuration. The literals are then aggregated by AND and OR to produce a true result in this case.

Referring now to FIGS. 4A-4B, a diagram 400 is shown of DNF selection condition evaluation detail, according to an embodiment. FIG. 4A depicts input tables required to perform the evaluation, while FIG. 4B depicts the evaluation of the inputs of FIG. 4A. Each of the tables shown depicts exemplary data storage operations that may be performed in sequence, corresponding to exemplary SQL Script statements provided herein. First, table 401 depicts an example configuration; the table's name is "configurations". Here, configuration ID #0815 has COLOR=BLUE and SIZE=L.

Next, table 402 depicts an input table with a selection condition (specified by dependency ID #4711) and a configuration to be solved. Table 402's name is "toBeSolved". Table 403 represents the object dependency as it goes into the evaluation process.

Table 404 depicts a join of concrete configuration values with the selection condition in DNF, and a comparison of values. SQL Script statements that correspond to this table are provided here:

```
executedCompare =
    SELECT
        inp.dependency_id,
        inp.config_id,
        dep.disjunction_id,
        dep.is_negation,
        dep.characteristic,
        dep.value AS dep_value,
        config.value AS config_value,
        CASE
            -- in case negation flag is not set
            WHEN dep.is_negation <> 'X' AND dep.value =
                config.value THEN 1
            -- in case negation flag is set
            WHEN dep.is_negation = 'X' AND dep.value <>
                config.value THEN 1
            ELSE 0
        END AS literal_result
    FROM        :toBeSolved AS inp
    INNER JOIN dependencies AS dep ON
        dep.dependency_id = inp.dependency_id
    INNER JOIN configurations AS config ON
        config.config_id = inp.config_id;
```

Table 405 depicts aggregation results per AND-group, with a minimum function. SQL Script statements that correspond to this table are provided here:

```
executedAND =
    SELECT
        dependency_id,
        config_id,
        disjunction_id,
        MIN(literal_result) AS and_result
    FROM :executedCompare
    GROUP BY
        dependency_id,
        config_id,
        disjunction_id;
```

Table 406 depicts aggregation results per OR-group, with a maximum function. The result of the selection condition evaluation for the concrete configuration may be outputted by an embodiment. SQL Script statements that correspond to this table are provided here:

```
executedOr =
    SELECT
        dependency_id,
        config_id,
        MAX(and_res) AS or_result
    FROM :executedAND
    GROUP BY
        dependency_id,
        config_id;
```

In general, rule-evaluation systems, such as those that evaluate object dependencies, evaluate true/false conditions in sequence and therefore need to do so quickly because the rules to be evaluated may be very complex. In-memory databases are often set-based, designed for performing aggregations instead of calculations, for speed. Thus, arranging AND and OR combinations of literals, whether using DNF or CNF, is advantageous because converting expressions to these forms allows evaluations to be performed in two aggregation steps (one AND, one OR). Aggregations may be done in parallel in in-memory databases, taking further advantage of the fact that secondary storage I/O delays may be avoided. Even if the AND and OR operations cannot be parallelized, literal evaluation may be performed in parallel independent operations, followed by separate AND and OR aggregations.

Figure 5:
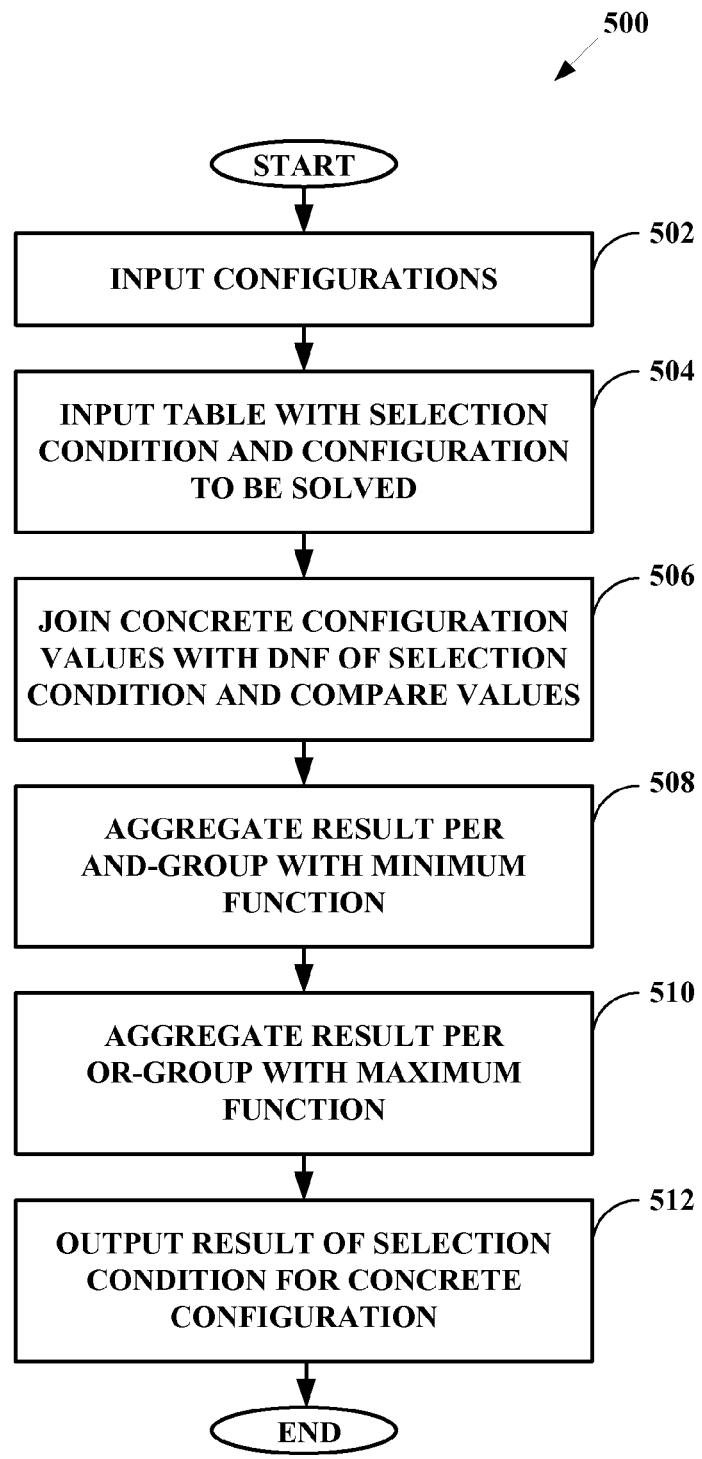
FIG. 5 is a flowchart of an exemplary method of evaluating object dependency for in-memory technology, according to an exemplary embodiment.

Referring now to FIG. 5, a flowchart 500 is shown comprising an exemplary method for implementation of the embodiments for evaluating object dependency in in-memory databases described above. This method may be implemented by a processor executing instructions in a computer system, to be described, and the instructions may be tangibly embodied in a computer-readable medium or computer program product. The method execution may begin at 502 when the processor may receive input configurations, which may for example describe a possible product line. At 504, the processor may receive an input table with a particular selection condition and a desired configuration to be evaluated. The configuration may describe a product variant, and the selection condition may determine if the variant requires a particular component or is a variant that may be manufactured or sold or meets other requirements for a product line, for example.

At 506, the processor may join concrete configuration values with the selection condition (in DNF or CNF), and compare values. At 508, the processor may aggregate the results by AND-group with a minimum function (for the case where DNF is used). At 510, the processor may aggregate the results of the prior aggregation per OR-group with a maximum function (for the case where DNF is used). One of ordinary skill in the art will understand that when CNF is used, the aggregation order will be the opposite, i.e., first an aggregation per OR-group followed by an aggregation per AND-group. At 512, the processor may output the result of the selection condition for the concrete configuration.

In some embodiments, extensions of DNF may add new levels to the DNF tree to cover the special dependency syntax used in following additional scenarios, which are now each described in detail:

General literals: Literals form the leaves of the DNF tree. Strictly speaking, literals in the context of a pure DNF tree may only consist of simple Boolean comparisons. As previously noted, literals in a variant configuration dependency may be more general. For example, a comparison in a selection condition need not relate to a fixed value; there may also be comparisons between two characteristics, and there may be calculations involved, such as "LENGTH=WIDTH+3".

Multiple values: In the evaluation of variant configuration dependencies, the value of a characteristic is not necessarily unique since characteristics may have multiple values. For example, there may be a characteristic "extras" with values "air conditioning" and "special color" and a selection condition involving a literal "extras=air conditioning". Such literals may need to be evaluated for all values of the characteristic.

In-lists: Dependencies may offer a special syntax element called an "in-list" to describe a set and/or range of values. For example, a selection condition may involve the condition "SIZE IN {10, 21-23}" which evaluates true if the integer characteristic size is 10, 21, 22, or 23. Such a condition does not convert directly into a literal.

Variant tables: Dependencies may offer a special syntax element called a "variant table". Variant tables are lookup tables for selection conditions. They may have columns for the characteristics involved in the condition, and they may contain the evaluation of a selection condition for combinations of characteristics values. For example:

| WIDTH | STRENGTH | HEIGHT | |
|---|---|---|---|
| 10 | 20 | 20 | TRUE |
| 10 | 10 | 20 | TRUE |

Referring now to FIGS. 6A-6B, a pure DNF tree 600 is shown in FIG. 6A in the format previously shown and in FIG. 6B in a format using the following rules and simplifications for clarity:

Aggregation nodes, whether aggregated over via AND or OR operators, are solid black circles.

Operation nodes that represent an operation such as a comparison use a blackened-top-circle depiction. Operation nodes involve only a specific predetermined maximum number of operands. In one embodiment, operation nodes may involve either one or two operands, as fewer table columns lead to better performance in a particular in-memory database. However, this design choice also means that an operation that involves three or more operands may need to be split up artificially.

Dotted lines indicate optional relationships.

Aggregation nodes are depicted with two child nodes, but embodiments may have any number of child nodes in an aggregation.

Pruning: There is full symmetry in a purely DNF tree, meaning that all nodes of one level of the tree have the same structure. In this description, only the leftmost node for each level is depicted in its full structure. The other nodes to its right are abbreviated and their child nodes are omitted for clarity.

In the following description, the diagrams depict the generic form a dependency may take, and the extended tree is simply called the "dependency tree" to avoid confusion with a pure DNF tree.

Figure 7:
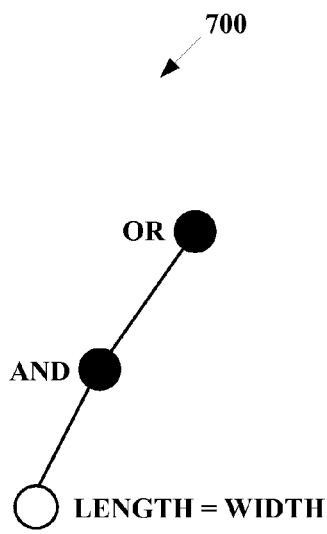
FIG. 7 is a diagram of a dependency tree representing a selection condition with non-fixed-value literals, according to an exemplary embodiment.

Referring now to FIG. 7, a dependency tree 700 is shown representing a selection condition with non-fixed-value literals, according to an embodiment. In this depiction, an open circle represents the more general literals used in dependencies, as a reminder of their increased scope compared to literals of a pure DNF tree. In this example, the dependency tree represents a selection condition "LENGTH=WIDTH", where length and width are characteristics. This example illustrates only a very simple literal used in a dependency, but literals may involve any number of steps and operands.

Figure 8A:
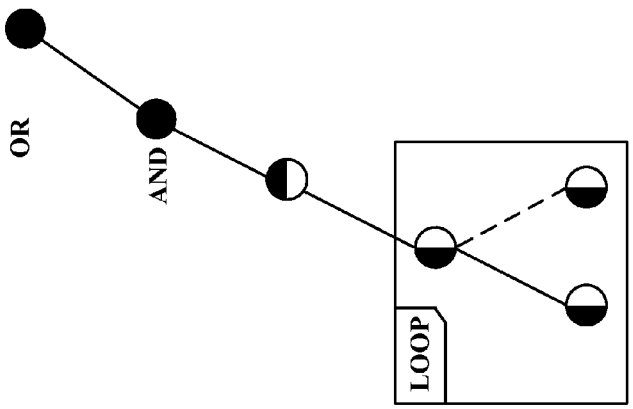
FIGS. 8A-8C are diagrams of dependency trees with non-fixed-value literals, according to an exemplary embodiment.
Figure 8B:
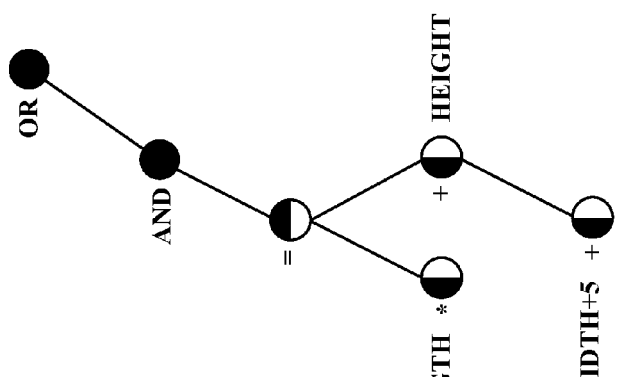
Figure 8C:
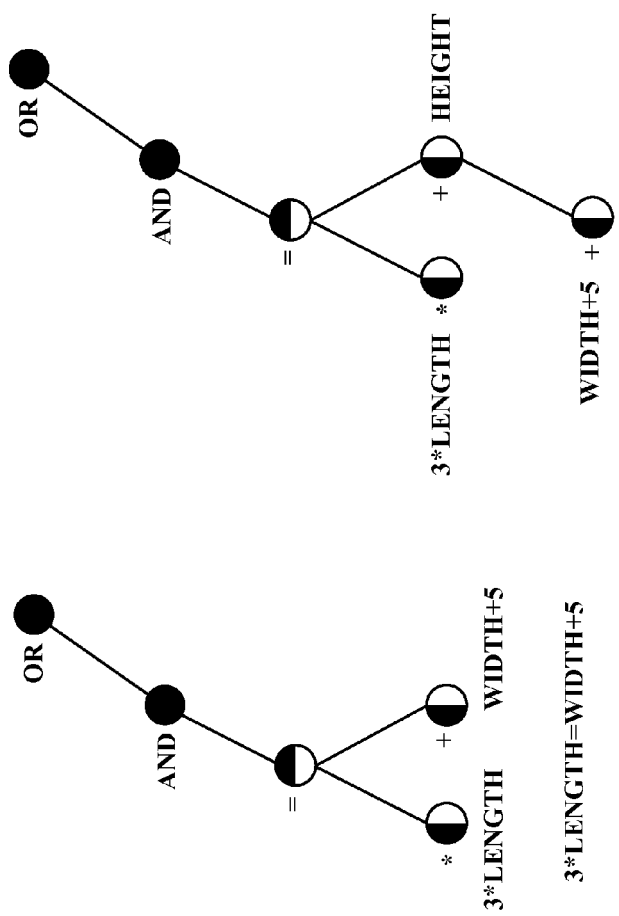

Referring now to FIGS. 8A-8C, dependency trees 800 with non-fixed-value literals are shown, according to an embodiment. FIG. 8A depicts a selection condition literal of the form "3*LENGTH=WIDTH+5." This literal may be decomposed into a simple Boolean expression (depicted with a blackened-top circle) that handles only the actual comparison, and child nodes (depicted with a blackened-side circle) may handle the separate determination of values "3*LENGTH" and "WIDTH+5".

FIG. 8B depicts a selection condition literal of the form "3*LENGTH=WIDTH+5+HEIGHT." The additional operands "WIDTH+5" and "HEIGHT" may be handled separately, due to the design choice of having a maximum of two operands per operation.

FIG. 8C depicts a dependency with nested complex operations that handle additional operands or operations through additional operation elements. Note that between the nested levels of the tree, there is no aggregation in this embodiment. Instead, the output of one operation may be passed on as the input of the next higher level operation.

Figure 9:
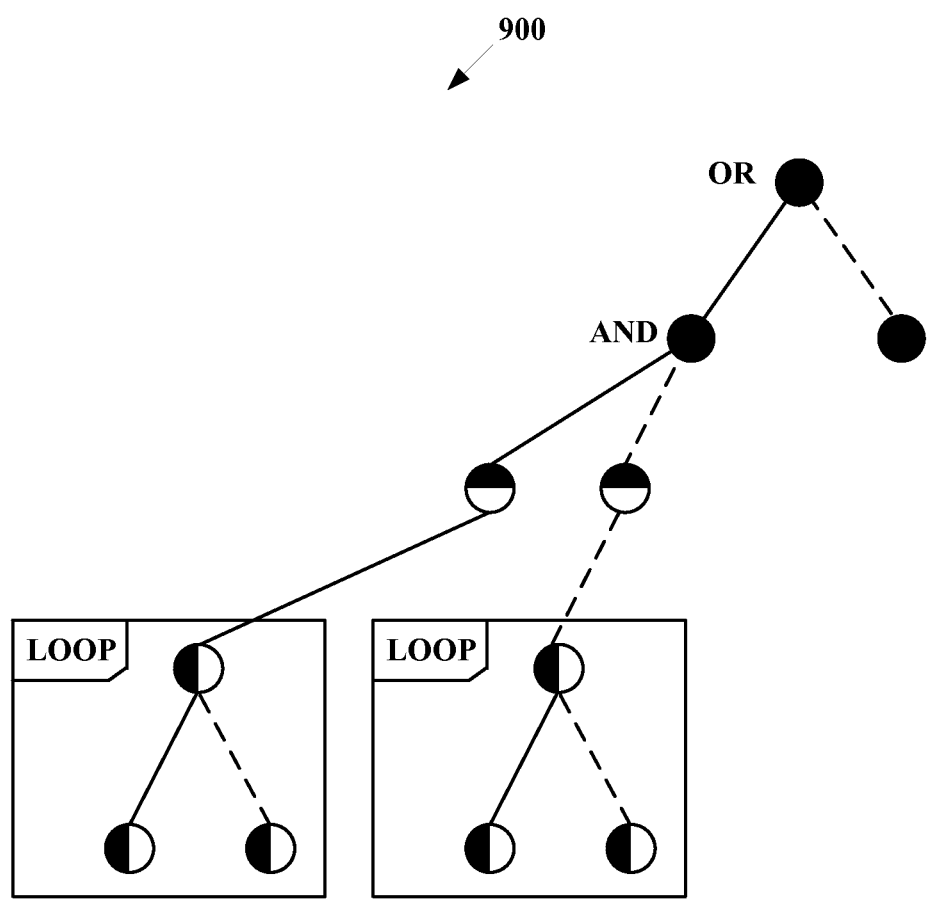
FIG. 9 is a diagram of a first generalization of a pure DNF tree into a dependency tree, according to an exemplary embodiment.

Referring now to FIG. 9, a first generalization 900 of the pure DNF tree into a dependency tree is shown, according to an embodiment. Generalization of the dependency tree enables orderly evaluation of more general literals and operations. Embodiments with this extended capability may be of particular utility for variant configuration scenarios.

Figure 10:
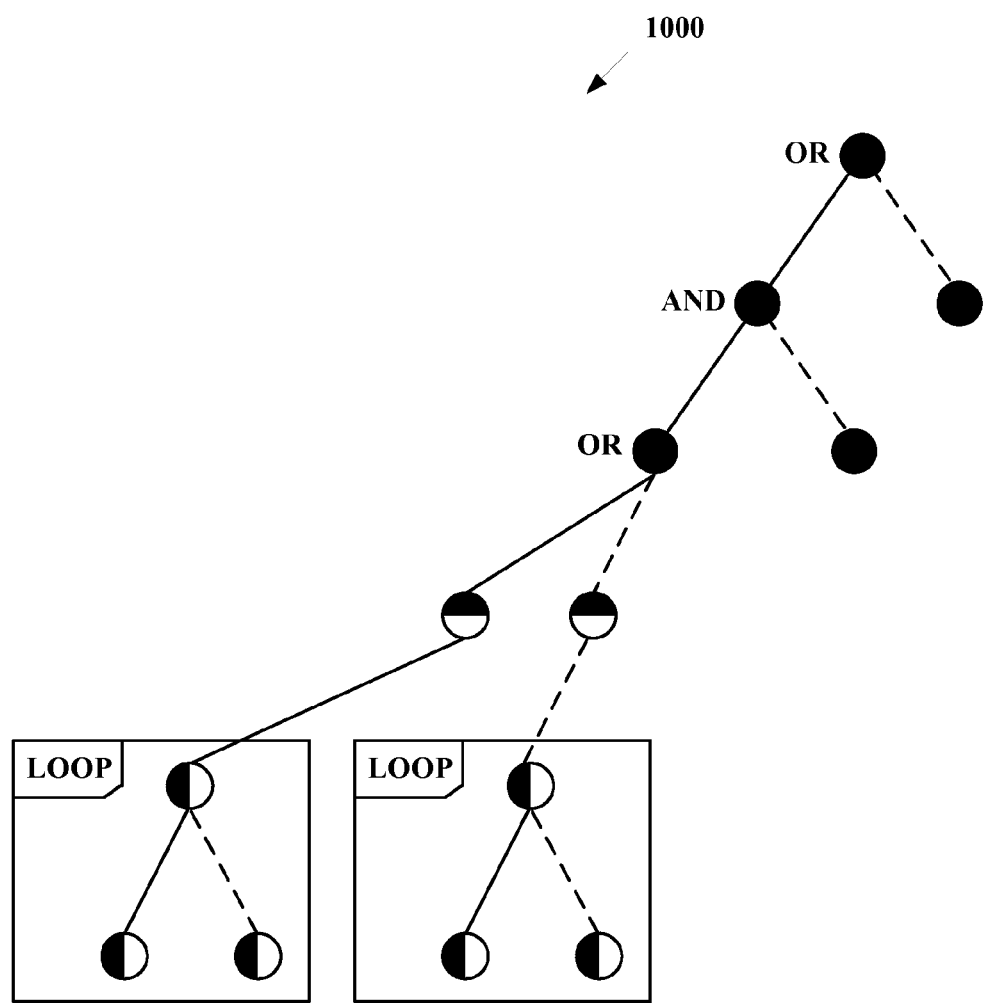
FIG. 10 is a diagram of a second generalization of the DNF tree into a dependency tree, according to an exemplary embodiment.

Referring now to FIG. 10, a second generalization 1000 of the DNF tree into a dependency tree is shown, according to an embodiment. This generalization considers extended literals and operations, as well as multi-valued characteristics. Multiple values of a characteristic lead to a multiplication of literals. In the example given above, characteristic "extras" has values "air conditioning" and "special color" and a selection condition demands "extras=air conditioning". In this embodiment, the selection condition may be checked for each actual value of the characteristic. In this case, the embodiment may perform two checks (i.e., with "air conditioning" and "special color") to determine if the selection condition is fulfilled.

In the language of DNF this action appears as an additional "OR" aggregation level. Since every characteristic may potentially have multiple values for the dependency tree, the embodiment may add another aggregation node just above the tree layer that deals with the characteristics. Aggregations are fast in in-memory technologies, so this approach is advantageous.

Figure 11B:
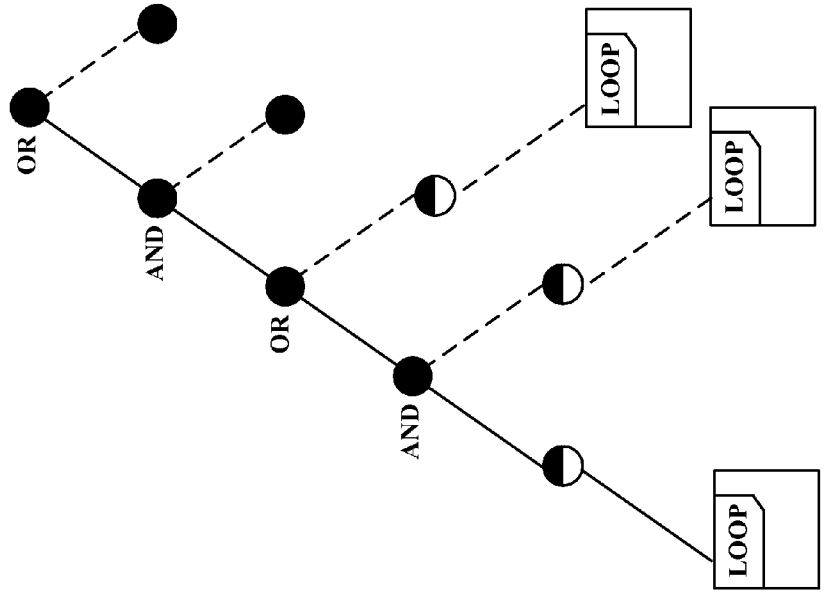
FIGS. 11A-11B are diagrams of a dependency tree with an in-list in a specific representation and a more general representation, according to an exemplary embodiment.
Figure 11A:
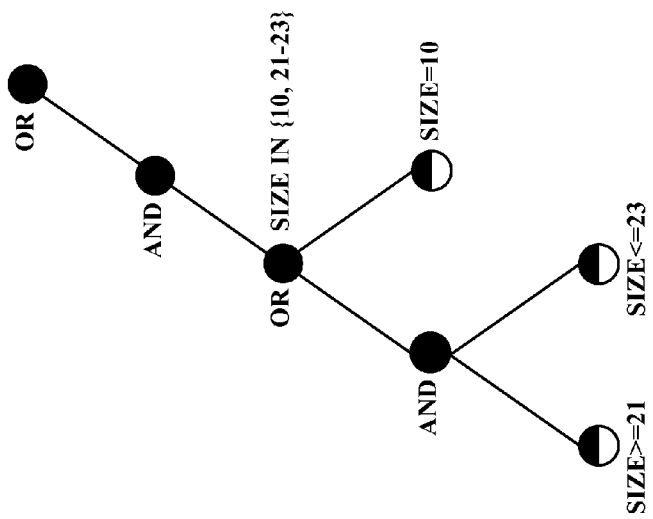

Referring now to FIGS. 11A-11B, a dependency tree 1100 with an in-list is shown in a specific and more general representation, according to an embodiment. In the example given above, the in-list "SIZE IN {10, 21-23}" may translate into a small DNF of its own: (size=10) OR ((size>=21) AND (size<=23)). Theoretically, this condition could be reflected in the already existing DNF structure in the dependency tree as shown in FIG. 11A, or by appending it at the bottom of the tree. However since the in-list is a feature used in the leaves of the dependency tree, reflecting the condition in the already existing DNF structure would greatly expand the data volume of the dependency tree due to the combinatorics involved.

One embodiment therefore adds another aggregation level into the dependency tree to evaluate the in-lists "locally" as leaves, rather than multiplying them into the DNF structure shown in FIG. 11A. Note that the OR aggregation level introduced to cover multi-value characteristics may be reused for the aggregation of in-lists.

FIG. 11B depicts a general form of a dependency tree with in-lists. The compressed loop box represents the nested operation tree as described previously. This generalization considers extended literals, operations, multi-valued characteristics, as well as in-lists.

Figure 12B:
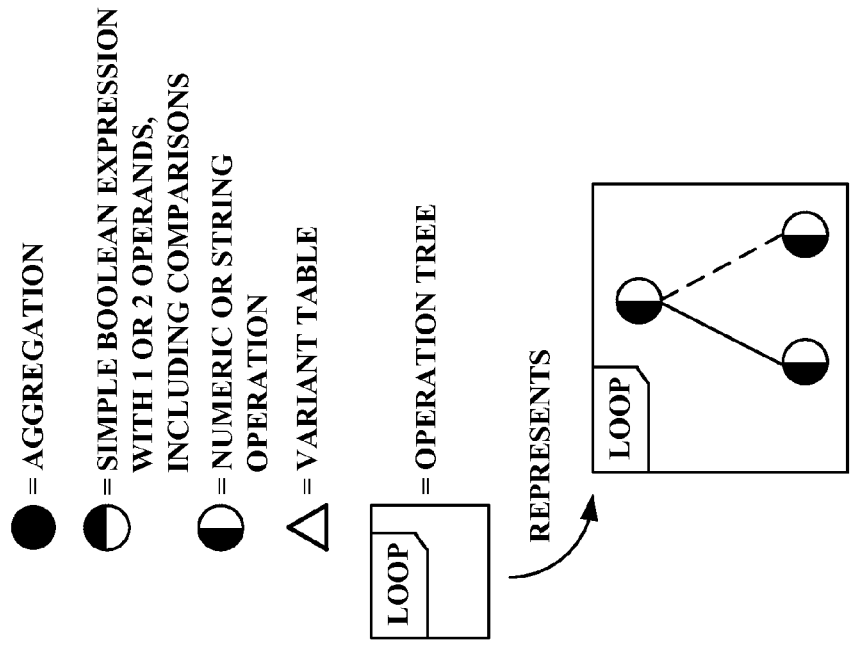
FIGS. 12A-12B are diagrams of a final general dependency tree with representations of special features used in variant configuration, and a diagram legend, according to an exemplary embodiment.
Figure 12A:
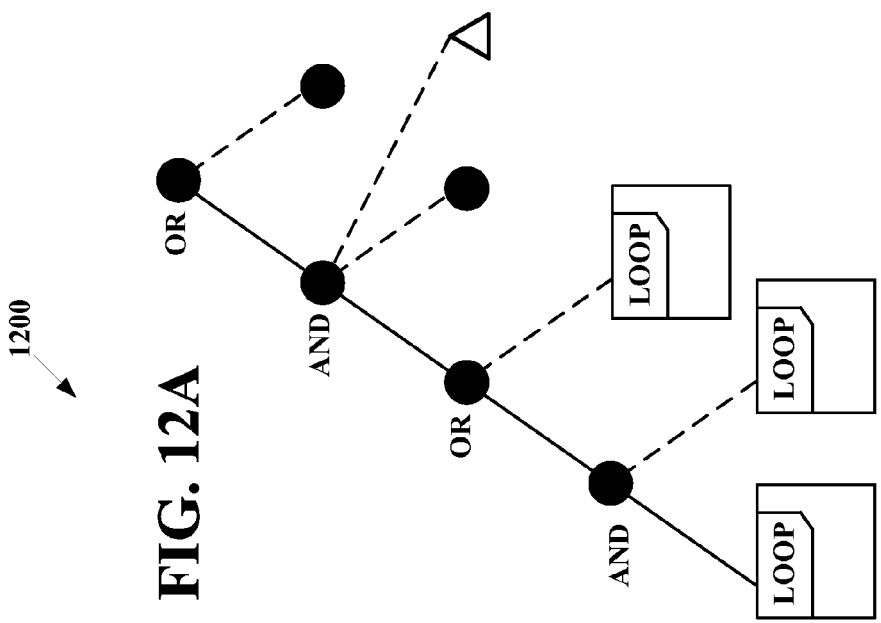

Referring now to FIG. 12A, a final general dependency tree 1200 with representations of special features used in variant configuration is shown, according to an embodiment. This dependency tree also integrates in variant tables, which are an alternative way of expressing a condition in a tabular overview rather than in dependency syntax. Theoretically, variant tables could be transformed and integrated into the existing DNF structure contained in the dependency tree. For similar reasons as for the in-list operator, in one embodiment variant tables may be treated separately. In this embodiment, the variant tables are evaluated separately and their result is merged with the results of the conditions that are provided in non-variant table syntax.

In FIG. 12A, the variant table evaluation is represented by a triangle symbol for the purpose of illustrating the structure of the dependency tree clearly. Note that for the integration of the variant table evaluation, in-lists cannot be combined with variant tables. It is therefore sufficient to consider variant tables at the first conjunction level (i.e., the "leaf level" of the original, underlying DNF tree). FIG. 12B is a legend summarizing the various representations described above in this description. The final general dependency tree contains representations of special features as used in variant configuration, including extended literals and operations, multi-valued characteristics, in-lists, and variant tables.

Figure 13:
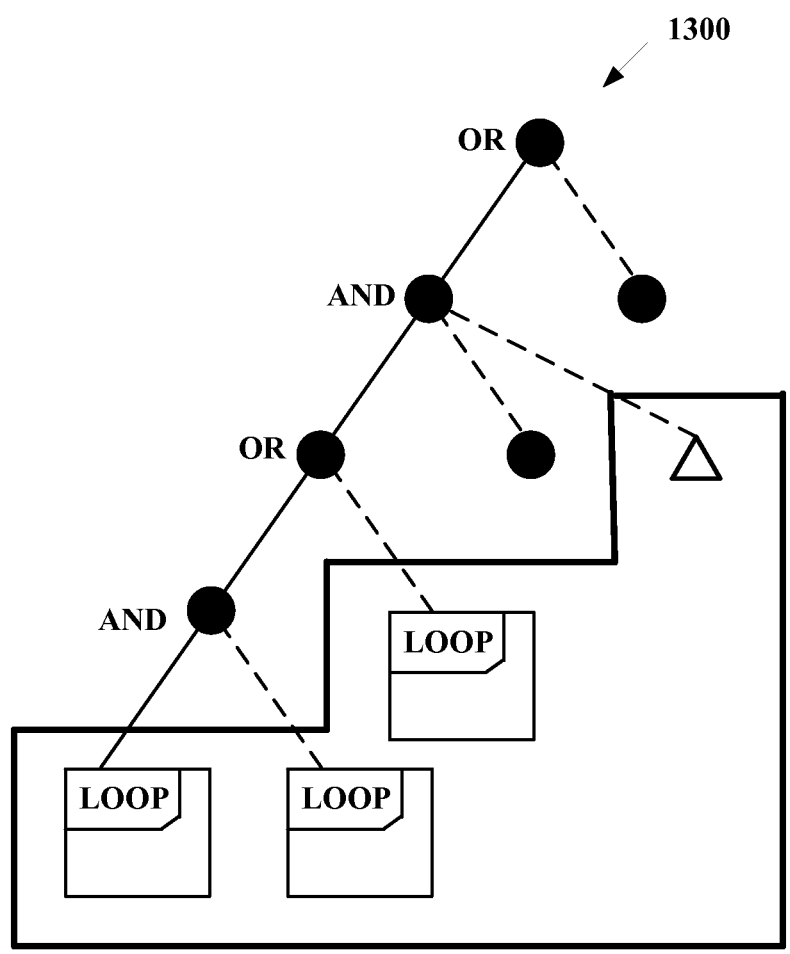
FIG. 13 is a diagram of a final general dependency tree denoting parallelization, according to an exemplary embodiment.

Referring now to FIG. 13, a final general dependency tree 1300 is shown denoting parallelization, according to an embodiment. Processing parallelization is possible in this embodiment only at the leaves of the tree, shown within the enclosure. In another embodiment, an additional level of parallelization may be implemented by separately processing dependencies involving string operations and those involving numeric operations. The separate processing comprises building up and evaluating separate, complete dependency trees as described above, with one for numerics and one for strings.

To summarize the extensions, in various embodiments, the dependency tree may be literally grown from a standard DNF tree. Additional, variant configuration specific features may be incorporated by translating and integrating them into the pattern of conjunctive and disjunctive aggregations. Due to the alternating structure of disjunctions and conjunctions at different levels, the dependency tree may store conditions either in DNF or CNF. CNF may be implemented merely by skipping the first disjunction in the root node in one embodiment. While most of the dependency structure is best represented in DNF, some features such as in-lists tend to be closer to a conjunctive normal form.

In another embodiment, the normal form representation used for individual dependencies and the features used therein may be optimized per dependency. The DNF and CNF dependency representations may be evaluated separately.

Note that due to the splitting up of arithmetic calculations into a separate "sub-tree" of the dependency representation the following situation may arise: A selection condition involves several branches connected with OR. One of these branches is immediately evaluated to "true", while another branch contains a sub-tree of arithmetic operations. An implementation that evaluates the calculation tree first, before the aggregation across the OR-branches happens, is inefficient. Thus, one embodiment may evaluate and aggregate all simple OR-branches, and may evaluate the complex OR-branches with calculations only if the simple ones evaluate as "false".

Figure 14:
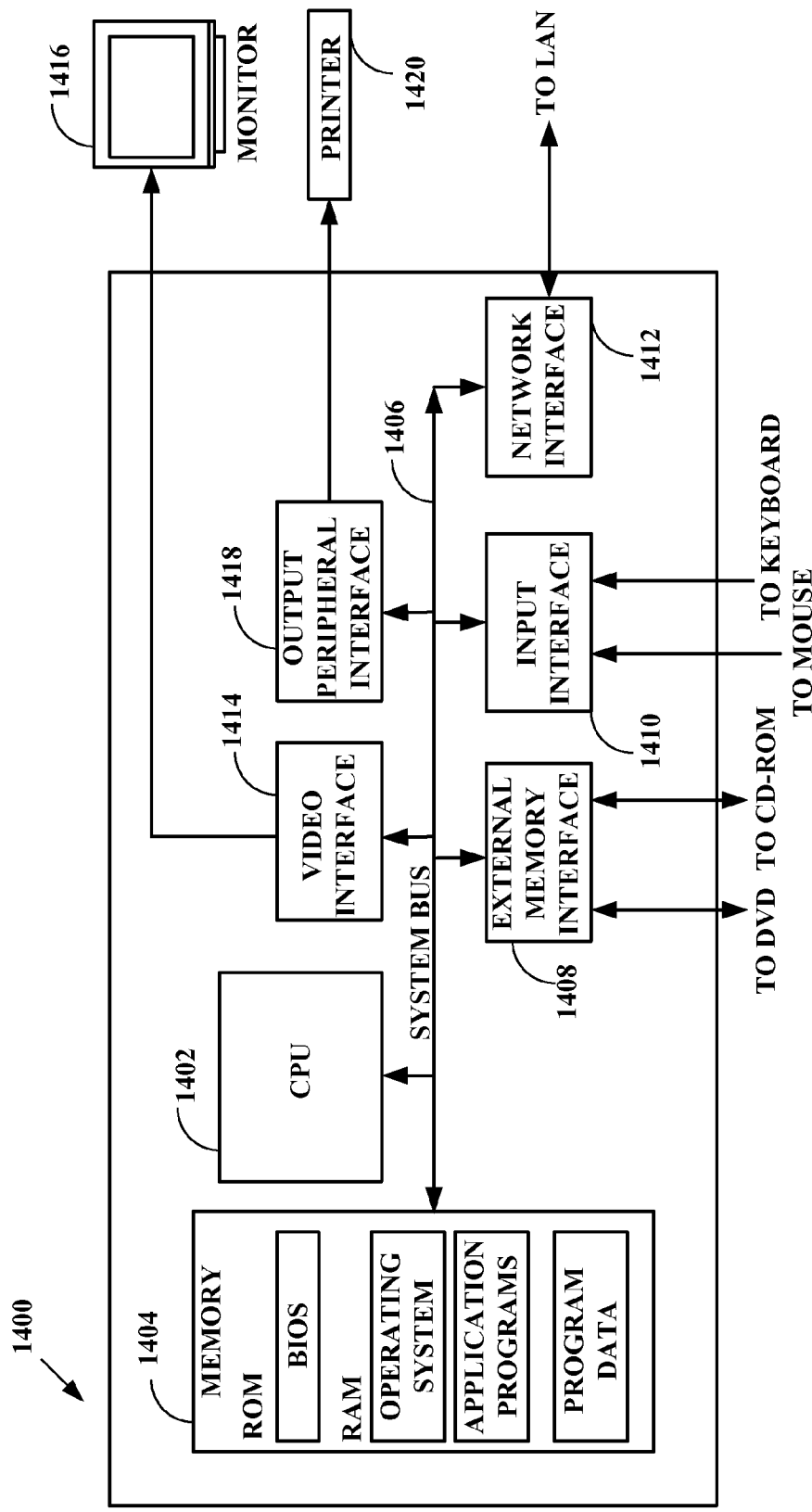
FIG. 14 is a diagram of an exemplary computer system to implement various embodiments.

Referring now to FIG. 14, a computer system 1400 is shown comprising an exemplary structure for implementation of the embodiments described above. Computer system 1400 comprises a central processing unit (CPU) or processor 1402 that processes data stored in memory 1404 exchanged via system bus 1406. Memory 1404 may include read-only memory, such as a built-in operating system, and random-access memory, which may include an operating system, application programs, and program data. Computer system 1400 may also comprise an external memory interface 1408 to exchange data with a DVD or CD-ROM for example.

Further, input interface 1410 may serve to receive input from user input devices including but not limited to a keyboard, a mouse, or a touchscreen (not shown). Network interface 1412 may allow external data exchange with a local area network (LAN) or other network, including the internet. Computer system 1400 may also comprise a video interface 1414 for displaying information to a user via a monitor 1416 or a touchscreen (not shown). An output peripheral interface 1418 may output computational results and other information to optional output devices including but not limited to a printer 1420 for example via an infrared or other wireless link.

Computer system 1400 may comprise a mobile computing device such as a personal digital assistant or smartphone for example, along with software products for performing computing tasks. The computer system of FIG. 14 may for example receive program instructions, whether from existing software products or from embodiments of the present invention, via a computer program product and/or a network link to an external site.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While particular embodiments of the present invention have been described, it is to be understood that various different modifications within the scope and spirit of the invention are possible. The invention is limited only by the scope of the appended claims.

What is claimed is:

1. A computer-implemented method for variant configuration, comprising:
   using a computer, loading a dependency tree comprising Boolean expressions describing an input selection condition into memory in one of disjunctive normal form (DNF) and conjunctive normal form (CNF);
   joining concrete configuration values from input configuration data with the dependency tree, and comparing values of one or more literals;
   aggregating the comparison results and aggregating the aggregation results, using an AND-group with a minimum function and an OR-group with a maximum function in an alternating sequence ordered corresponding to the chosen normal form; and
   outputting the result of the selection condition evaluation for the concrete configuration;
   wherein each separate branch of the dependency tree comprises Boolean expressions selectively cast in one of DNF and CNF according to which normal form most reduces the number of Boolean expressions in each branch.

2. The method of claim 1 further comprising evaluating multiple Boolean expressions at least one of simultaneously and in increasing complexity order.

3. The method of claim 1 further comprising evaluating multiple aggregations simultaneously.

4. The method of claim 1 further comprising generalizing the dependency tree to evaluate added terms comprising at least one of a non-fixed-value literal, a multi-valued literal, an in-list, and a variant table, by translating and integrating each added term into the sequence of aggregations.

5. The method of claim 4 further comprising evaluating the added terms separately at each leaf level of the generalized dependency tree.

6. The method of claim 1 further comprising evaluating multiple dependency trees simultaneously by evaluating string operations and numeric operations in separate dependency trees.

7. A system for variant configuration, comprising:
   a processor executing non-transitory instructions to:
      load a dependency tree comprising Boolean expressions describing an input selection condition into memory in one of disjunctive normal form (DNF) and conjunctive normal form (CNF);
      join concrete configuration values from input configuration data with the dependency tree, and comparing values of one or more literals;
      aggregate the comparison results and aggregate the aggregation results, using an AND-group with a minimum function and an OR-group with a maximum function in an alternating sequence ordered corresponding to the chosen normal form; and
      output the result of the selection condition evaluation for the concrete configuration;
      wherein each separate branch of the dependency tree comprises Boolean expressions selectively cast in one of DNF and CNF according to which normal form most reduces the number of Boolean expressions in each branch.

8. The system of claim 7 wherein the processor evaluates multiple Boolean expressions at least one of simultaneously and in increasing complexity order.

9. The system of claim 7 wherein the processor evaluates multiple aggregations simultaneously.

10. The system of claim 7 wherein the processor further generalizes the dependency tree to evaluate added terms comprising at least one of a non-fixed-value literal, a multi-valued literal, an in-list, and a variant table, by translating and integrating each added term into the sequence of aggregations.

11. The system of claim 10 wherein the processor evaluates the added terms separately at each leaf level of the generalized dependency tree.

12. The system of claim 7 wherein the processor evaluates multiple dependency trees simultaneously by evaluating string operations and numeric operations in separate dependency trees.

13. A non-transitory computer readable medium storing instructions that,
   when executed by a processor, perform a variant configuration method comprising:
      loading a dependency tree comprising Boolean expressions describing an input selection condition into memory in one of disjunctive normal form (DNF) and conjunctive normal form (CNF);
      joining concrete configuration values from input configuration data with the dependency tree, and comparing values of one or more literals;
      aggregating the comparison results and aggregating the aggregation results, using an AND-group with a minimum function and an OR-group with a maximum function in an alternating sequence ordered corresponding to the chosen normal form; and
      outputting the result of the selection condition evaluation for the concrete configuration;
      wherein each separate branch of the dependency tree comprises Boolean expressions selectively cast in one of DNF and CNF according to which normal form most reduces the number of Boolean expressions in each branch.

14. The medium of claim 13 further comprising instructions for evaluating multiple Boolean expressions at least one of simultaneously and in increasing complexity order.

15. The medium of claim 13 further comprising instructions for generalizing the dependency tree to evaluate added terms comprising at least one of a non-fixed-value literal, a multi-valued literal, an in-list, and a variant table, by translating and integrating each added term into the sequence of aggregations.

16. The medium of claim 15 further comprising instructions for evaluating the added terms separately at each leaf level of the generalized dependency tree.

17. The medium of claim 13 further comprising instructions for evaluating multiple dependency trees simultaneously by evaluating string operations and numeric operations in separate dependency trees.

* * * * *